US011113803B2

(12) United States Patent
Saphier et al.

(10) Patent No.: US 11,113,803 B2
(45) Date of Patent: Sep. 7, 2021

(54) INSPECTION OF A SUBSTRATE USING MULTIPLE CAMERAS

(75) Inventors: Ofer Saphier, Rehovot (IL); Israel Shappira, Rosh Ha'ayin (IL); Yaakov Davidi, Nof Ayelon (IL)

(73) Assignee: Orbotech Ltd., Yavne (IL)

(*) Notice: Subject to any disclaimer, the term of this patent is extended or adjusted under 35 U.S.C. 154(b) by 1478 days.

(21) Appl. No.: 12/809,299

(22) PCT Filed: Jan. 11, 2009

(86) PCT No.: PCT/IL2009/000043
§ 371 (c)(1),
(2), (4) Date: Jun. 18, 2010

(87) PCT Pub. No.: WO2009/090633
PCT Pub. Date: Jul. 23, 2009

(65) Prior Publication Data
US 2010/0309308 A1    Dec. 9, 2010

(30) Foreign Application Priority Data
Jan. 16, 2008    (IL) .......................................... 188825

(51) Int. Cl.
*G06T 7/40*    (2017.01)
*G01N 21/88*    (2006.01)
(Continued)

(52) U.S. Cl.
CPC ....... *G06T 7/0004* (2013.01); *G01N 21/8851* (2013.01); *G01N 21/956* (2013.01);
(Continued)

(58) Field of Classification Search
USPC .......................................... 348/92
See application file for complete search history.

(56) References Cited

U.S. PATENT DOCUMENTS 5,517,234 A    5/1996    Gerber et al.
6,810,297 B2    10/2004    Adin et al.
(Continued)

FOREIGN PATENT DOCUMENTS

JP    01153944    6/1989
JP    1-148852 U    10/1989
(Continued)

OTHER PUBLICATIONS

Japanese Office Action issued in Japanese Patent Application No. 2010-542737 dated Mar. 4, 2013.
(Continued)

*Primary Examiner* — Mikhail Itskovich
(74) *Attorney, Agent, or Firm* — Hodgson Russ LLP

(57) ABSTRACT

Apparatus for inspection includes an imaging assembly, including a plurality of cameras, which are mounted in different, respective locations in the imaging assembly and are configured to capture respective images of a sample. A motion assembly is configured to move at least one of the imaging assembly and the sample so as to cause the imaging assembly to scan the sample with a scan accuracy that is limited by a predetermined position tolerance. An image processor is coupled to receive and process the images captured by the cameras so as to locate a defect in the sample with a position accuracy that is finer than the position tolerance.

28 Claims, 4 Drawing Sheets

(51) Int. Cl.
*G06T 7/00* (2017.01)
*G01N 21/956* (2006.01)
*G06T 7/33* (2017.01)

(52) U.S. Cl.
CPC ......... *G01N 21/95684* (2013.01); *G06T 7/33* (2017.01); *G06T 2207/10016* (2013.01); *G06T 2207/30108* (2013.01)

(56) References Cited

U.S. PATENT DOCUMENTS

| | | | |
|---|---|---|---|
| 6,898,306 B1 * | 5/2005 | Lu | 382/151 |
| 7,002,676 B2 | 2/2006 | Akiyama | |
| 7,009,163 B2 | 3/2006 | Katzir et al. | |
| 7,075,565 B1 | 7/2006 | Raymond et al. | |
| 7,129,509 B2 | 10/2006 | Katzir et al. | |
| 2001/0050331 A1 | 12/2001 | Yung et al. | |
| 2002/0055789 A1 * | 5/2002 | Ben-Ezra et al. | G05B 19/18 700/59 |
| 2002/0163582 A1 * | 11/2002 | Gruber et al. | 348/218.1 |
| 2003/0021886 A1 | 1/2003 | Baele | |
| 2004/0117055 A1 * | 6/2004 | Seidel et al. | 700/121 |
| 2004/0213449 A1 | 10/2004 | Safaee-Rad et al. | |
| 2006/0006311 A1 | 1/2006 | Katzir et al. | |
| 2006/0066843 A1 | 3/2006 | Guetta et al. | |
| 2010/0309308 A1 | 12/2010 | Saphier et al. | |

FOREIGN PATENT DOCUMENTS

| | | |
|---|---|---|
| JP | 5-240805 A | 9/1993 |
| JP | 06347410 | 12/1994 |
| JP | 07182521 | 7/1995 |
| JP | 09081736 | 3/1997 |
| JP | 11-211443 A | 8/1999 |
| JP | 2000-321168 A | 11/2000 |
| JP | 2001202520 A | 7/2001 |
| JP | 2002174849 A | 6/2002 |
| JP | 2002181729 A | 6/2002 |
| JP | 2004-226128 A | 8/2004 |
| JP | 2005520123 A | 7/2005 |
| JP | 2005-249946 A | 9/2005 |
| JP | 2005528586 A | 9/2005 |
| JP | 2006031551 A | 2/2006 |
| JP | 2006-105884 A | 4/2006 |
| JP | 2006292404 | 10/2006 |
| JP | 2007101300 | 4/2007 |

OTHER PUBLICATIONS

Communication dated Oct. 15, 2014, issued by Taiwanese Patent Office in corresponding Taiwan Application No. 097148415.
Communication dated Nov. 24, 2016, issued by the Intellectual property Office of Taiwan in corresponding Taiwanese Application No. 097148415.
English translation of Communication dated Jun. 10, 2015, issued by the Japanese Intellectual Property Office in counterpart Japanese Patent Application No. 2014-151456.

* cited by examiner

INSPECTION OF A SUBSTRATE USING MULTIPLE CAMERAS

FIELD OF THE INVENTION

The present invention relates generally to automated optical inspection, and specifically to systems and methods that use multiple cameras to inspect an object.

BACKGROUND OF THE INVENTION

Systems for automated optical inspection (AOI) commonly use electronic imaging cameras. As defined herein, such a camera contains an image sensor, i.e., an integrated two-dimensional (2D) array of detector elements, such as a charge-coupled device (CCD) or complementary metal-oxide semiconductor (CMOS) array, along with suitable optics. In some applications, the area of a sample that is to be inspected is larger than the field of view (FOV) of the image sensor. In such cases, the camera typically captures multiple images as the FOV is scanned over the sample, and an image processor combines the information in these images in order to detect defects or other features of the sample. (Other AOI systems use line arrays and TDI sensors.)

In some AOI systems of this sort, each image that is captured overlaps with one or more neighboring images. For example, U.S. Pat. No. 7,129,509, whose disclosure is incorporated herein by reference, describes an inspection system that includes at least one 2D array of photosensors, which is employed to acquire images representing an object, such as images of an electrical circuit. Images that are at least partially overlapping are acquired, and pixels in the overlapping images, associated with corresponding portions of the object, are added together to form a composite image of the object.

As another example, U.S. Pat. No. 7,075,565, whose disclosure is incorporated herein by reference, describes an automated optical inspection system that includes a plurality of asynchronously-triggerable cameras for providing image data of an object, such as a printed circuit board. The circuit board is divided into fields of view that are to be imaged in one or more cameras in one or more lighting modes. Each location on the board can be imaged by each camera in a plurality of lighting modes in a single pass across the board. In one embodiment, each camera can image a given point on the circuit board twice, with each image having a different lighting mode. The speed of the assembly can be selected to allow the board to be imaged with a predetermined number of lighting modes in one pass over each stripe.

A similar sort of approach is described in U.S. Patent Application Publication 2006/0066843, whose disclosure is incorporated herein by reference. An illumination module irradiates a surface of a sample with pulsed optical radiation. A mechanical scanner translates at least one of the sample and part of the imaging system so as to scan an area irradiated by the pulsed optical radiation over the surface in order to irradiate successive, partially overlapping frames on the surface with respective successive pulses of the pulsed radiation. A collection module collects the optical radiation scattered from the surface so as to capture a sequence of images of the irradiated frames. A system controller varies a configuration of the imaging system in alternation between at least first and second different optical configurations in synchronization with the pulsed optical radiation.

SUMMARY OF THE INVENTION

AOI systems that make use of multiple cameras and overlapping images, such as those described above, must typically maintain strict alignment between the cameras and the sample so that pixels in different images may be properly registered over the entire sample area. Meeting this alignment constraint requires costly, high-precision mounting and motion assemblies to scan the FOV of the cameras over the sample with the required position accuracy.

In embodiments of the present invention, on the other hand, an image processor registers neighboring images by aligning image features in areas of overlap between the images. (The term "features," as used in the context of the present patent application and in the claims, refers to any and all recognizable characteristics of the pixel values taken over a given area of the image, including not only corners and edges, for example, but also gray-scale gradations.) The image registration may be carried out continuously over all the images during the scan, so that the image processor can determine global positions of the defects without accumulated error. The image processor is thus able to combine the images and locate defects in the sample with a position accuracy that is finer than the position tolerance of the motion assembly. Consequently, the precision of the motion assembly may be relaxed in systems based on the principles of the present invention, and the cost of such systems may thus be reduced considerably by comparison with systems known in the art.

There is therefore provided, in accordance with an embodiment of the present invention, apparatus for inspection, including:

an imaging assembly, including a plurality of cameras, which are mounted in different, respective locations in the imaging assembly and are configured to capture respective images of a sample;

a motion assembly, which is configured to move at least one of the imaging assembly and the sample so as to cause the imaging assembly to scan the sample with a scan accuracy that is limited by a predetermined position tolerance; and an image processor, which is coupled to receive and process the images captured by the cameras so as to locate a defect in the sample with a position accuracy that is finer than the position tolerance.

In disclosed embodiments, each of the respective images contains a respective area of the sample, having a region of overlap with one or more neighboring images captured by the cameras in the imaging assembly, and the image processor is configured to register the respective images with one another using the region of overlap in order to compute a position of the defect. Typically, the neighboring images have respective relative offsets that vary within the position tolerance of the motion assembly, and the image processor is configured to compute the respective relative offsets. The images typically include pixels having a pitch, and in one embodiment, the image processor is configured to compute the respective relative offsets with a precision that is finer than the pitch, and to combine the images using the respective relative offsets to produce a combined image having a resolution finer than the pitch.

In some embodiments, the images include pixels having pixel values and have a given signal/noise ratio (SNR), and the image processor is configured to sum the pixel values of the neighboring images in the region of overlap in order to produce a combined image having a greater SNR than the given SNR.

Alternatively or additionally, the image processor is configured to recover a virtual position clock responsively to a periodic pattern on the sample that appears in the respective images captured by at least one of the cameras and to relative movement between the sample and the imaging assembly that is applied by the motion assembly, and to use the virtual position clock in registering the respective images with one another.

In a disclosed embodiment, the apparatus includes at least one light source, which is configured to illuminate the sample in at least first and second different illumination configurations during a scan of the sample by the imaging assembly, so that the images captured by the cameras include at least first and second sets of the images captured respectively in the first and second illumination configurations at different positions in the scan.

Typically, the motion assembly is configured to move the sample relative to the imaging assembly without gripping the sample.

In some embodiments, the plurality of the cameras includes at least twenty cameras and may include at least one hundred cameras.

In a disclosed embodiment, the cameras in the imaging assembly are arranged in respective positions in at least one row along a direction transverse to a scan direction of the motion assembly so that the images captured by each of the cameras as the imaging assembly scans the sample cover a respective swath of the sample along a scan direction of the motion assembly, and so that the swaths together cover an entire active area of the sample in a single scan of the imaging assembly across the sample. Typically, the at least one row includes at least first and second rows, and the respective positions of the cameras in the first row are staggered in the transverse direction relative to the positions of the cameras in the second row.

In one embodiment, the motion assembly is configured to cause the imaging assembly to scan the sample in a scan direction, and the apparatus includes at least one post-inspection camera and a transverse motion unit, which is configured to shift the at least one post-inspection camera in a direction transverse to the scan direction while the imaging assembly scans the sample so that the at least one post-inspection camera images an area of the defect located by the image processor. Typically, the image processor is configured to compute an error signal, indicative of a deviation of movement of the motion assembly relative to an ideal motion model, and to drive the at least one post-inspection camera to image the area of the defect responsively to the error signal.

There is also provided, in accordance with an embodiment of the present invention, a method for inspection, including:

scanning a sample using an imaging assembly, including a plurality of cameras, which are mounted in different, respective locations in the imaging assembly, with a scan accuracy that is limited by a predetermined position tolerance;

capturing respective images of the sample using the cameras while scanning the sample; and processing the images captured by the cameras so as to locate a defect in the sample with a position accuracy that is finer than the position tolerance.

The present invention will be more fully understood from the following detailed description of the embodiments thereof, taken together with the drawings in which:

DETAILED DESCRIPTION OF EMBODIMENTS

Figure 1:
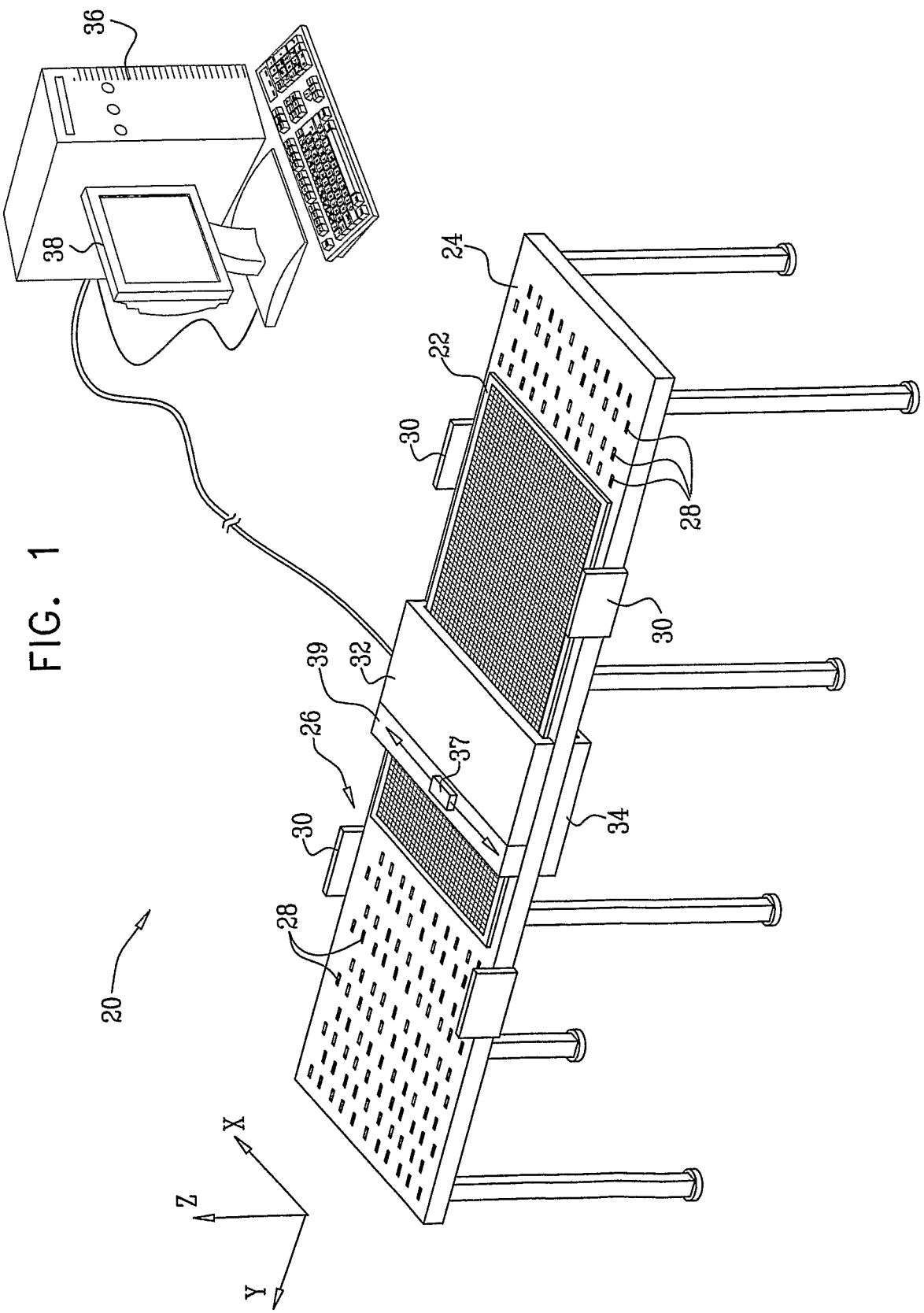
FIG. 1 is a schematic, pictorial illustration of a system for AOI, in accordance with an embodiment of the present invention.

FIG. 1 is a schematic, pictorial illustration of a system 20 for automated optical inspection of a sample 22, in accordance with an embodiment of the present invention. In the illustrated embodiment, the sample is a flat panel display (FPD), which comprises a large glass substrate with appropriate circuit components formed on its upper surface. (The dimensions of the glass substrates that are currently used in manufacturing FPDs may be as large as 246×216 cm.) Alternatively, system 20 may be adapted, mutatis mutandis, for inspection of generally planar substrates of other types, such as printed circuit boards and integrated circuit wafers. Furthermore, the principles of the present invention may be applied in inspection of non-planar samples, as well During inspection, sample 22 is supported by a table 24 with an integrated motion assembly 26. In the example shown in FIG. 1, the motion assembly comprises an array of wheels 28, which propel the sample in the scan direction (which is identified as the Y-direction for clarity and consistency in the explanation that follows). Guides 30 engage the edges of the sample so as to keep the sample aligned in the scan direction. Optionally, table 24 may comprise suction ports and a levitating conveyor as described in U.S. Pat. No. 6,810,297, whose disclosure is incorporated herein by reference. There is no need, however, for system to grip sample 22 to ensure accurate motion as in AOI systems that are known in the art, and wheels 28 may provide adequate sample motion without special means of control.

Figure 3:
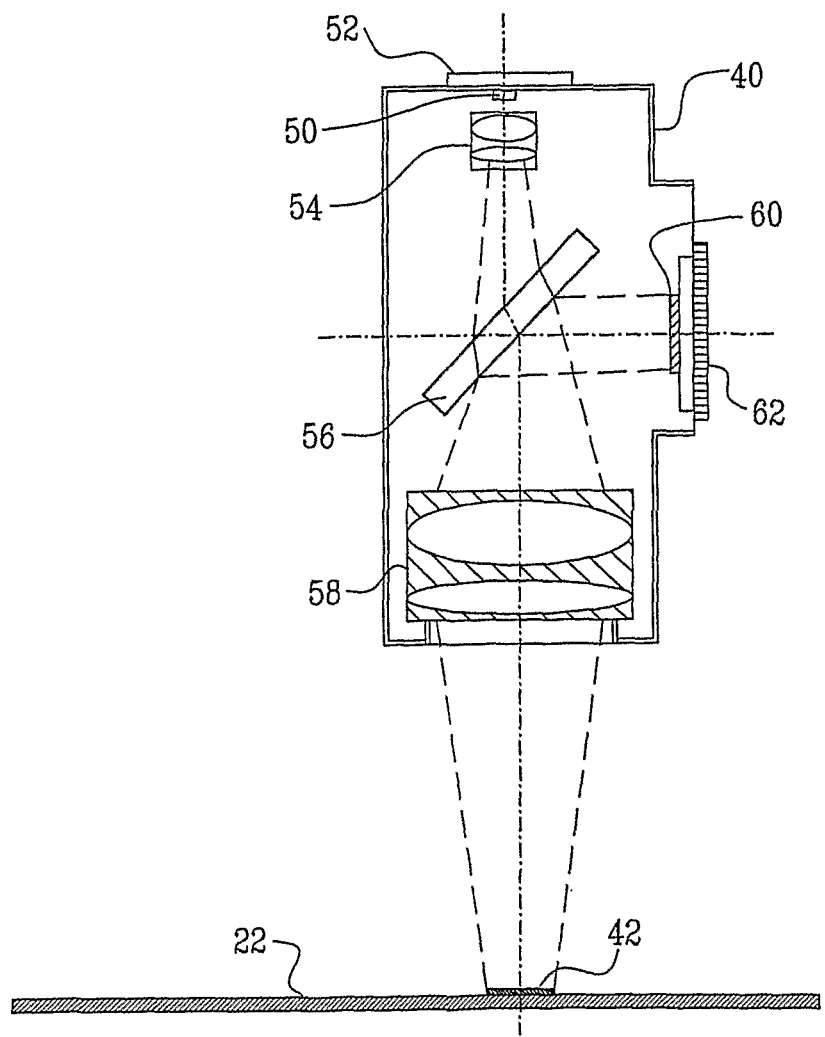
FIG. 3 is a schematic side view of an electronic imaging camera, in accordance with an embodiment of the present invention.

As motion assembly 26 conveys sample 22 along table 24, an imaging assembly 32 captures images of the circuit components on the surface of the sample. Details of the imaging assembly are shown in the figures that follow. Alternatively or additionally, the motion assembly may be configured to move the imaging assembly over the surface of the sample. In either case, the motion assembly causes the imaging assembly to scan across the surface of the sample. During the scan, a light source typically illuminates the sample with pulsed light in order to avoid image blur due to relative motion between the imaging assembly and the sample during image capture. The light source may be integrated into imaging assembly 32, as illustrated in FIG. 3. Alternatively or additionally, a separate light source 34 may be provided on the opposite side of sample 22 for the purpose of transillumination. Further alternatively or additionally, a light source (not shown in the figures) that is on the same side of the sample as the imaging assembly, but separate from the imaging assembly, may be used (particularly when the sample is to be imaged in dark field mode).

An image processor 36 receives and processes the images captured by imaging assembly 32 in order to identify and locate defects in the circuit components on sample 22. Typically, the image processor comprises a one or more general-purpose computers, which are programmed in software to carry out the functions that are described herein. This software may be downloaded to the computers in electronic form, over a network, for example, or it may be provided on tangible media, such as optical, magnetic, or electronic storage media. Alternatively, for enhanced processing speed, at least some of the functions of the image processor may be carried out by dedicated or programmable hardware components. The image processor outputs defect information, such as a defect report and/or images of suspected defects, to an output device 38, such as a video monitor or a printer (not shown). Alternatively or additionally, the image processor may measure and report on other characteristics of the sample, such as critical dimensions or macro defects.

When image processor 36 identifies a defect on the sample, the image processor should determine and indicate the location of the defect with a position accuracy sufficient to diagnose and, in some case, repair the defect. In a typical FPD application, for example, the image processor should measure the location coordinates of the defect with an error no greater about ±20 µm. Determining the defect coordinates to this level of accuracy in the fixed frame of reference of system 20 would normally require that the position of sample 22 relative to imaging assembly 32 during the inspection scan be controlled to within a tolerance no greater than this level of error. Needless to say, maintaining this tolerance over the large area of a sample requires that motion assembly 26 comprise complex, costly components and grip the sample tightly in order to prevent any uncontrolled motion.

In system 20, however, image processor 36 determines the locations of defects in sample 22 not in the fixed frame of reference of the system, but rather in the moving frame of reference of the sample itself. By analyzing the pattern of the circuit components printed on the sample, the image processor is able to determine the location of the defect relative to a point of reference on the sample, such as the edge of the sample or a known fiducial mark. For example, when the circuit components are formed in a known pattern of repeating cells (as is common in FPDs and many other types of integrated electronic devices), the image processor can count the number of cells between the point of reference on the sample and the defective cell and can measure the precise coordinates of the defect within this cell.

Optionally, system 20 may comprise one or more post-inspection cameras 37, typically with high-magnification optics, for performing closer inspection and classification of suspected defects. Such a camera may be mounted on a transverse motion unit 39, such as a suitable translation stage, "downstream" from imaging assembly 32. Thus, areas of sample 22 reach the location of camera 37 after they have passed under the imaging assembly. When image processor 36 detects a suspected defect in the images generated by the imaging assembly, it drives unit 39 to the transverse (X) location of the defect at the time when the defect is expected to pass beneath the location of camera in the scan (Y) direction (which may equivalently be seen as the time axis).

This expected (X,Y) position is based on the assumption of ideal movement of the sample with constant velocity in the Y direction and no shift in X or angular skew. In order to compensate for the non-ideal movement of the sample in X, Y and angle, image processor 36 computes the sample motion by registering the overlapping images with one another and thus constructing the shift between frames captured by imaging assembly 32. In this way, the image processor can compute an exact motion error signal (ΔX, ΔY, and angular skew), which indicates the deviation of the real position of the sample relative to the ideal motion model. The image processor uses the motion error signal to calculate the expected position of the defect relative to an ideal position and thus to guide camera 37 accordingly. At the expected time and position, camera 37 captures one or more high-magnification images of the defect, typically using a strobe or flash illumination to overcome motion smear in the image. These images may then be analyzed by the image processor or by a human operator in order to classify the defect and decide what further action, if any, is required.

Typically, as is shown and explained in greater detail hereinbelow, imaging assembly 32 comprises multiple cameras, which are arrayed so as to capture overlapping images of the cameras' respective fields of view, each of which contains only a small area of sample 22. Image processor 36 registers and aligns these individual images into a combined image of the sample by matching features in the overlap regions between neighboring images. The image processor is then able to determine defect locations with reference to this combined image. The defect locations may be determined, as described above, with reference to a repeating pattern on the sample or simply in terms of pixels in the combined image.

Because image processor 36 locates the defects in the frame of reference of the sample itself, there is no need in system 20 for precise control of the position and motion of the sample. Therefore, the position tolerance of motion assembly 26 may be considerably greater than the position accuracy with which the image processor locates the defects. For example, the actual position of the sample at any point in time during the scan through system 20 may vary by as much as ±100 mm relative to the nominal position at that point, while the image processor still achieves defect location accuracy no worse than ±20 µm, as noted above, or even as fine as ±1 µm. This high location accuracy is important not only for accurate defect reporting, but also for accurate positioning of post-inspection camera 37 and other review and repair devices. Furthermore, the image processor may use the accurate position information in choosing particular, location-specific processing algorithms to use in particular areas of the sample.

Figure 2:
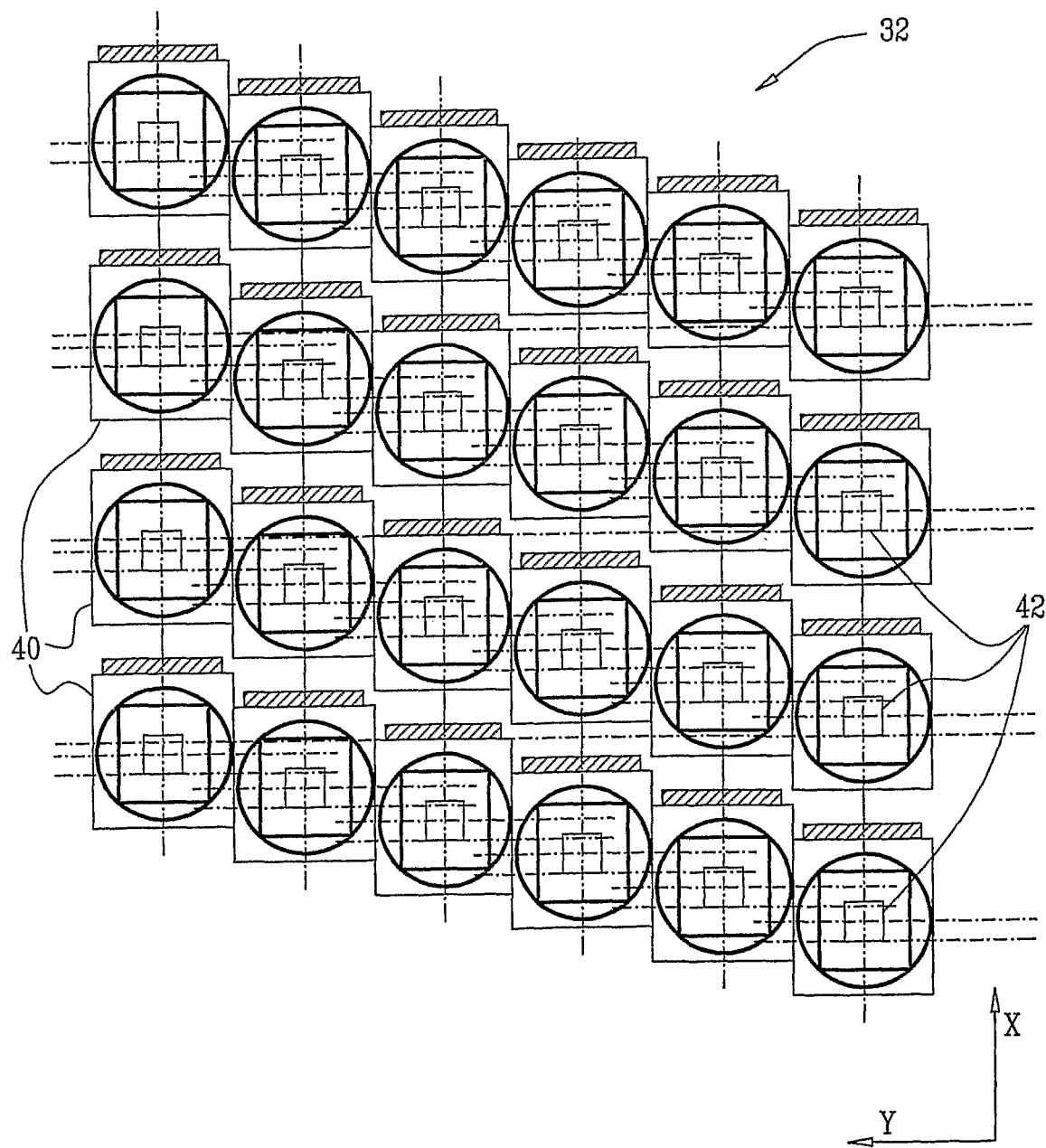
FIG. 2 is a schematic bottom view of an imaging assembly, in accordance with an embodiment of the present invention.

Reference is now made to FIGS. 2 and 3, which schematically show details of imaging assembly 32, in accordance with an embodiment of the present invention. FIG. 2 is a bottom view of the imaging assembly, shown from the perspective of sample 22. The imaging assembly comprises multiple cameras 40, one of which is shown in side view in FIG. 3. The particular camera design of FIG. 3 and the layout of the imaging assembly in FIG. 2 are shown solely by way of example, in order to explain the operation of system 20. Other multi-camera designs may also be used, such as designs in which multiple image sensors are mounted on the same printed circuit substrate.

Imaging assembly 32 comprises a large number of cameras 40, typically at least twenty cameras for inspecting smaller samples, such as printed circuit boards, up to one hundred cameras for inspecting large-scale FPDs, and possibly as many as several hundred for higher-resolution systems. Alternatively, if cameras contain high-resolution image sensors (for example, 5-8 megapixels) the number of cameras may be reduced to about 50 in lower resolution systems. On the other hand, the principles of the present invention are not limited to any particular number of cameras, and may be implemented in systems that use a smaller number of cameras, such as ten cameras or less. Such systems are also considered to be within the scope of the present invention.

Figure 5:
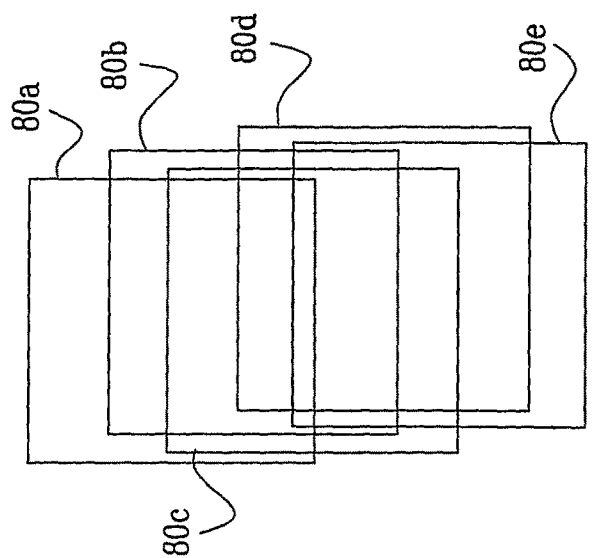
FIGS. 4 and 5 are schematic top views of a sample, showing patterns of images of the sample that are captured by a system for AOI, in accordance with an embodiment of the present invention.
Figure 4:
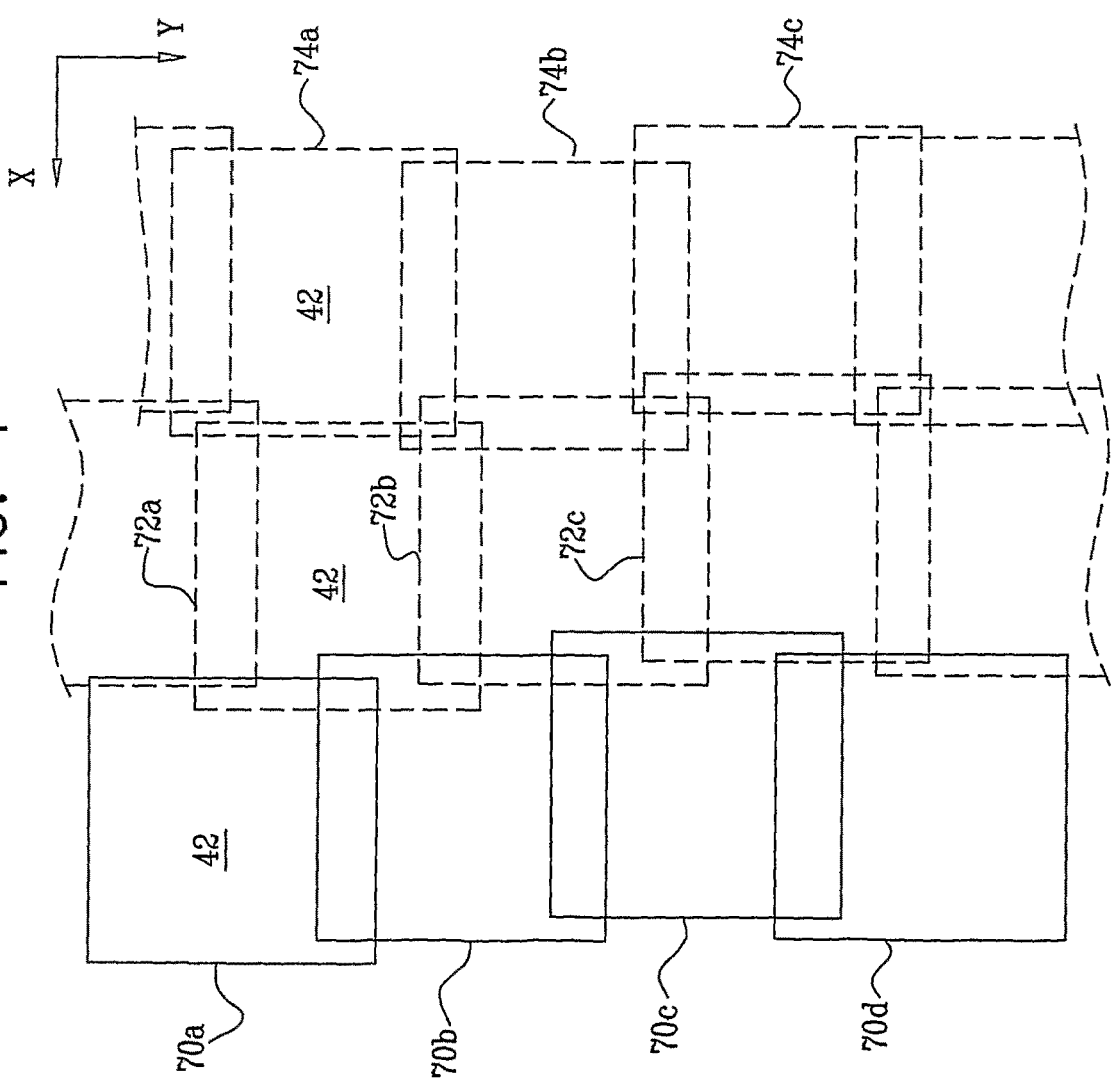

Cameras 40 are arrayed over the surface of sample 22, typically in one or more rows along the direction transverse to the scan (marked as the X-direction in the figures). Each camera 40 captures images of a respective field of view (FOV) 42. The cameras may be arrayed in the transverse direction across the entire width of the sample. Each camera captures multiple images as sample 22 progresses in the Y (scan) direction. As long as the maximal scan rate, relative to the frame rate of the cameras, is such that the distance traversed by the sample between successive image frames is no greater than the width of the FOV in the scan direction, the images captured by each camera will overlap at least the preceding and succeeding images captured by that camera. Scan patterns of this sort are shown in FIGS. 4 and 5, for example. As a result, the images captured by each camera will cover a long, narrow swath on the sample along the scan direction.

Systems that are designed to inspect fine features and locate minute defects, such as system 20, typically operate at high magnification, and FOV 42 may therefore be considerably smaller than the outer dimensions of the camera itself, as illustrated in FIG. 2. Therefore, a single row of cameras along the X-direction will not be able to image the entire active area of the sample (i.e., the entire area on which circuit components are formed, possibly excluding the margins) in a single pass along the Y direction. There may also be gaps between the fields of view of adjacent cameras if light sources are interleaved between the cameras (to provide dark-field illumination, for example).

To overcome this problem, cameras 40 are arrayed in imaging assembly 32 in multiple rows, as shown in FIG. 2, wherein the cameras in each row are offset in the X-direction relative to the other rows. By choosing a suitable offset between the rows, the swaths imaged by the individual cameras can be made to overlap in the X-direction so as to permit reliable registration between the images notwithstanding the loose motion tolerance. The number and placement of the cameras may be such that the entire width of the active area of sample 22 is covered in a single pass of the sample under imaging assembly 32. There is thus no need to provide for repeat scans or for transverse motion either of the sample or of components of the imaging assembly. Alternatively, the swaths imaged by the individual cameras may cover only a portion of the width of the active area of the sample, and multiple scans may be used, if desired, with the imaging assembly at different transverse positions relative to the sample.

In the embodiment shown in FIG. 3, camera 40 comprises a light source 50, such as a high-intensity light-emitting diode (LED), with a suitable drive circuit 52 for pulsing the light source. The beam emitted by the light source may be shaped by appropriate illumination optics 54 and is cast onto FOV 42 by objective optics 58 via a beamsplitter 56. Optics 58 form an image of the circuit components in FOV 42 onto an image sensor 60 via beamsplitter 56. The image sensor is connected via a suitable camera circuit 62 to image processor 36, which thus receives electronic images (in the form of analog signals or digital image data) from all of the cameras in imaging assembly 32.

The arrangement of camera 40 that is shown in FIG. 3 is convenient in that it permits both the illumination and imaging components of system 20 to be packaged together in a tight space, typically no more than a few centimeters across. Alternatively, other arrangements of the illumination and imaging components may be used in system 20, wherein the illumination components may be packaged either together with the imaging components, sharing common optics as in FIG. 3, or in a separate illumination module.

Image sensors 60 in cameras 40 may be standard, off-the-shelf devices, such as the MT9M001C12STM CMOS sensor, produced by Micron Technology Inc. (Boise, Id.). This sensor is an array of 1280×1024 detector elements with a pitch of 5.2 µm. It is designed to output image data at roughly 40 megapixels/sec (giving full-frame output at 30 frames/sec). Assuming optics 58 are designed so that FOV has a width of about 6-10 mm, sensor 60 will give image resolution at the object plane of about 6-10 which is sufficient for most FPD inspection applications, for example. This level of resolution, which is above the diffraction limit, permits cameras 40 to use simple, low-cost optics with high F-number and large depth of field. Furthermore, because of the image registration and alignment functions performed by image processor 36, there is generally no need for precise alignment of the optics in each camera or for precise relative alignment among the cameras.

Notwithstanding the low resolution and low output speed (relative to special, state-of-the-art cameras used in high-end AOI systems) of cameras 40, the use of a large number of cameras, arrayed across the transverse (X) dimension of the sample, permits system 20 to operate at a high rate of throughput. This rate is typically limited by the computing power of image processor 36, rather than the capabilities of imaging assembly 32. Even if image sensors 60 in cameras 40 have relatively high noise and low dynamic range in comparison with specialized, high-performance cameras, these disadvantages may be overcome by reducing the scan speed of motion assembly 26, thus increasing the degree of overlap of successive images and providing image processor 36 with additional data at each pixel. This sort of scan in illustrated in FIG. 5, and the benefits that may be derived from such a scan are described with reference to this figure.

Based on the arrangement of cameras and the typical dimensions that are described above, an imaging assembly containing two hundred cameras can be used to scan the entire surface of a sample that is 100-150 cm wide in a single pass. Despite the large number of cameras, the relaxation of tolerances that is explained above results in system 20 being considerably lower in cost than systems of comparable performance that use precision, high-performance cameras, optics and motion assemblies. The unique structure and scan pattern of imaging assembly 32 can also afford other performance advantages, such as the possibility of varying the lighting conditions from frame to frame, as explained below.

FIG. 4 is a schematic top view of a sample (such as sample 22), showing a pattern of images 70, 72, 74 that are captured by imaging assembly 32, in accordance with an embodiment of the present invention. This example shows the images captured by three of cameras 40 whose respective fields of view 42 are adjacent in the transverse (X) direction. One of these cameras captures successive images 70a, 70b, 70c, 70d, . . . (collectively referred to as images 70); the next captures successive images 72a, 72b, 72c, . . . (collectively, images 72); and the third captures successive images 74a, 74b, 74c, . . . (collectively, images 74). Each image captured by a given camera overlaps with a number of neighboring images, including both its predecessor and images captured by the neighboring cameras.

The images are intentionally shown in FIG. 4 as being imperfectly aligned to illustrate the result of the loose position tolerance of motion assembly 26. The misalignment between frames is exaggerated in the figure for purposes of illustration, and in practice the deviation from alignment between successive frames is likely to be no more than a few pixels. Nevertheless, the misalignment may be greater than the accuracy with which image processor 36 is required to locate defects in the images captured by imaging assembly 32, particularly when cumulative error over a long scan is taken into account. The images may also be offset in the scan (Y) direction due to the relative offsets of cameras 40, as illustrated in FIG. 2.

Image processor 36 combines images 70, 72, 74, . . . , by stitching together neighboring images in the areas of overlap in order to determine the exact shift of each image relative to a given reference point. In effect, the image processor combines the images into a single, large-scale picture of sample 22, although this combined image may be created implicitly, without actually assembling the complete picture all at once in computer memory or on an output device. To stitch the pictures together, the image processor may, for example, use a digital filter that is matched to the shape of an image feature appearing in the overlap area. The filter may be based on prior knowledge of the shape of a feature appearing on the sample or, alternatively, it may be created ad hoc based on the image contents. The image processor searches through the possible values of relative offset between the neighboring images using this filter until it finds the offset that will maximize the correlation between the images. As noted earlier, because the offset is likely to be no more than a few pixels, the range of the search need not generally be very large, but larger search ranges are possible if necessary. The offset may be found to sub-pixel accuracy if a sufficient number of pixels are involved in the computation.

By precisely matching location coordinates of the feature in question in both overlapping images, the image processor is able to register the images in the combined picture. (As noted earlier, the term "feature" should be interpreted broadly to refers to any and all recognizable characteristics of the pixel values in the overlap region, including gray-scale gradations.) Location coordinates of features (such as defects) over the entire sample can be determined by chaining together such registration operations from the edge or a fiducial point on the sample. Alternatively, if the dimensions of each cell in the sample are known a priori, as in a FPD, for example, the image processor can count cells in the combined picture from the edge or fiducial point to the location of a defect or other feature of interest.

Image processor 36 may carry out the image registration process continuously over all the images created by cameras 40 during the scan over sample 22. The image processor can thus determine global positions of defects, without accumulated error. For each camera, the image processor computes an estimated shift (X,Y) and angular skew. (It can generally be assumed that the cameras are rigidly positioned relative to one another.) But collecting and processing the data from all cameras, the image processor can accurately estimate the motion between successive frames can be achieved. The image processor sums this motion to give a global position estimate, and is thus able to compute the position of a suspected defect in any given image frame with minimal error.

This sort of global position computation process is particularly useful when the image in a given image frame or group of frames is totally smooth (or featureless), so the relative position cannot be computed in that frame. In this case, the image processor uses data from other cameras to fill in the missing position information.

In effect, when the sample contains a periodic pattern (such as the cells of a FPD), image processor 36 recovers a virtual position clock based on the movement imparted by motion assembly 26 relative to the pattern. In other words, the repeating pattern in the images serves the function of a position encoder, encoding not only Y-direction scan motion, but also X-direction transverse motion and angular skew. This position clock may be applied in resampling all of images 70, 72, 74, . . . , so that the coordinates in the individual images are absolutely aligned, notwithstanding the relative offsets and skew between the individual clocks of different cameras. The cameras may share a common clock and other drive signals in order to reduce this sort of skew. When the cameras are staggered along the scan direction, however, as shown in FIG. 2, the frame clocks of the individual cameras will be inherently offset relative to the recovered position clock. This inherent offset can be used advantageously to increase the effective sampling density in the scan direction.

Furthermore, in some cases it may be advantageous to offset the frame clocks of neighboring cameras. Assuming the relative positions of the neighboring cameras to be maintained rigidly, the images captured by the cameras can be registered reliably regardless of the clock offset. Thus, for example, the frame clocks of neighboring cameras may be offset by 180°, thereby doubling the effective sampling rate of the imaging assembly. (By choosing 120° or 90° offsets, the effective sampling rate may likewise be tripled or quadrupled, and so forth.) The increased sampling rate may be useful in overcoming aliasing in imaging of certain periodic patterns, which could otherwise disrupt image registration. (The term aliasing, as used herein, refers to ambiguous results that may occur in periodic image frame capture due to the periodic pattern on certain samples, such as FPD panels. In such a situation, any motion shift of an integer number of periods would theoretically give the same image. This sort of aliasing should not be confused with aliasing effects having to do with the relation between image sensor pixel size and optical frequencies in an image.)

In some cases, the small areas of overlap between the individual images in FIG. 4 may not be sufficient to provide reliable system position recovery. To overcome this problem, the scan speed of the motion assembly may be reduced, relative to the image frame rate, to give a larger degree of overlap of the images in each of the image swaths, as illustrated in FIG. 5, for example.

Alternatively, the imaging assembly may include one or more additional cameras that are configured to operate at a higher frame rate and thus attain greater overlap. These cameras can then serve as a position reference for the remaining cameras. One way to achieve this higher frame rate in a CMOS sensor-based camera is to the reduce the scan area of the camera, i.e., to narrow the transverse (X-direction) range of the detector elements that are read out of the sensor, while continuing to read the full range of detector elements in the scan (Y) direction. (This sort of scan area reduction is sometimes referred to as selective region of interest [ROI] sensor operation.) The pixel clock of the reference camera remains unchanged. If the transverse range is reduced by half, for example, the images read out of the reference camera will be half as wide but will be read out at twice the previous frame rate. Successive images from the reference camera will then have large areas of overlap and can be used to recover a reliable clock for the images captured by the remaining cameras.

FIG. 5 is a schematic, top view of a sample (such as sample 22), showing a pattern of images 80 that are captured by imaging assembly 32, in accordance with another embodiment of the present invention. For the sake of simplicity, this figure shows only the swath of images captured by a single camera 40, but multiple parallel swaths of this sort may be captured in this manner shown in FIG. 4. In the embodiment of FIG. 5, however, motion assembly 26 advances sample 22 relatively slowly by comparison with the frame clock of the camera, so that each of images 80a, 80b, 80c, 80d, 80e, . . . , overlaps its predecessor by about 75%. The relative speeds of the motion assembly and the frame clock may be varied to give even larger or smaller areas of overlap between successive frames, depending on application requirements.

The large degree of overlap between the successive images is helpful, of course, in ensuring accurate registration, but it may also be exploited for other purposes of image enhancement. For example, following registration of the images, the pixel values in image 80a in the region of overlap with images 80b, 80c and 80d may be summed with the values of the corresponding pixels in the overlapping images to give a combined image with enhanced signal/ noise ratio (SNR).

As another example, the relative offsets between successive images may be computed, using the methods described above, with sub-pixel accuracy, i.e., with a precision that is finer than the pitch of the pixels in the images. Furthermore, because of the loose position tolerance of the scan, the offset between successive images will typically not be a whole number of pixels. Thus, in the region of overlap between images 80a, 80b, 80c and 80d (or between any other four successive images), each point on sample 22 is captured in four different, slightly offset pixels. Using the known, sub-pixel offset between the four images, the pixel data may be resampled on a common grid, with resolution finer than the pixel pitch of the individual images, and the resampled data may be interleaved or otherwise combined to give a single image with enhanced resolution (commonly referred to as super resolution).

As yet another example, the characteristics of the lighting that is produced by the lighting assembly may be varied from frame to frame, so that two or more different sets of the images are captured respectively under different illumination configurations at different positions in the scan. For example, images 80a and 80c may be captured under one type of lighting conditions, while images 80b and 80d are captured under another type (such as at a different intensity and/or wavelength of illumination). The individual images may then be combined in order to give a combined image with enhanced dynamic range or otherwise enhanced visibility of subtle image features.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An apparatus for inspection, comprising:
an imaging assembly, comprising a plurality of cameras, which are mounted in different, respective locations in the imaging assembly and are configured to capture respective images of a sample;
a motion assembly, which is configured to move at least one of the imaging assembly and the sample so as to cause the imaging assembly to scan the sample with a scan accuracy that is limited by a predetermined mechanical position tolerance; and
an image processor, which is coupled to receive and process the respective images captured by the plurality of cameras, and which locates a defect in the sample, relative to a point of reference on the sample, with a position accuracy that is finer than the mechanical position tolerance;
wherein the image processor is configured to recover a virtual position clock responsively to a periodic pattern on the sample that appears in the respective images captured by at least one of the plurality of cameras and to relative movement between the sample and the imaging assembly that is applied by the motion assembly, and to use the virtual position clock in registering the respective images with one another.

2. An apparatus for inspection, comprising:
an imaging assembly, comprising a plurality of cameras, which are mounted in different, respective locations in the imaging assembly and are configured to capture respective images of a sample;
a motion assembly, which is configured to move at least one of the imaging assembly and the sample so as to cause the imaging assembly to scan the sample with a scan accuracy that is limited by a predetermined mechanical position tolerance; and
an image processor, which is coupled to receive and process the respective images captured by the plurality of cameras, and which locates a defect in the sample, relative to a point of reference on the sample, with a position accuracy that is finer than the mechanical position tolerance,
wherein each of the respective images contains a respective area of the sample, having a region of overlap with one or more neighboring images captured by the plurality of cameras in the imaging assembly, and
wherein the image processor is configured:
to recover a virtual position clock responsively to a periodic pattern on the sample that appears in the respective images captured by at least one of the plurality of cameras and to relative movement between the sample and the imaging assembly that is applied by the motion assembly, and
to use the virtual position clock and one or more features appearing in the region of overlap in registering the respective images with one another.

3. The apparatus according to claim 2, wherein the neighboring images have respective relative offsets that vary within the position tolerance of the motion assembly, and wherein the image processor is configured to compute the respective relative offsets.

4. The apparatus according to claim 3, wherein the respective images comprise pixels having a pitch, and wherein the image processor is configured to compute the respective relative offsets with a precision that is finer than the pitch, and to combine the respective images using the respective relative offsets to produce a combined image having a resolution finer than the pitch.

5. The apparatus according to claim 2, wherein the respective images comprise pixels having pixel values and have a given signal/noise ratio (SNR), and wherein the image processor is configured to sum the pixel values of the neighboring images in the region of overlap in order to produce a combined image having a greater SNR than the given SNR.

6. The apparatus according to claim 1, and comprising at least one light source, which is configured to illuminate the sample in at least first and second different illumination configurations during a scan of the sample by the imaging assembly, so that the respective images captured by the plurality cameras comprise at least first and second sets of the respective images captured respectively in the first and second illumination configurations at different positions in the scan.

7. The apparatus according to claim 1, wherein the motion assembly is configured to move the sample relative to the imaging assembly without gripping the sample.

8. The apparatus according to claim 1, wherein the plurality of the cameras comprises at least twenty cameras.

9. The apparatus according to claim 8, wherein the plurality of the cameras comprises at least one hundred cameras.

10. The apparatus according to claim 1, wherein the plurality of cameras in the imaging assembly are arranged in respective positions in at least one row along a direction transverse to a scan direction of the motion assembly so that the respective images captured by each of the plurality of cameras as the imaging assembly scans the sample cover a respective swath of the sample along a scan direction of the motion assembly, and so that the swaths together cover an entire active area of the sample in a single scan of the imaging assembly across the sample.

11. The apparatus according to claim 10, wherein the at least one row comprises at least first and second rows, and wherein the respective positions of the plurality of cameras in the first row are staggered in the transverse direction relative to the positions of the plurality of cameras in the second row.

12. The apparatus according to claim 1, wherein the motion assembly is configured to cause the imaging assembly to scan the sample in a scan direction, and wherein the apparatus comprises at least one post-inspection camera and a transverse motion unit, which is configured to shift the at least one post-inspection camera in a direction transverse to the scan direction while the imaging assembly scans the sample so that the at least one post-inspection camera images an area of the defect located by the image processor.

13. The apparatus according to claim 12, wherein the image processor is configured to compute an error signal, indicative of a deviation of movement of the motion assembly relative to an ideal motion model, and to drive the at least one post-inspection camera to image the area of the defect responsively to the error signal.

14. A method for inspection, comprising:
scanning a sample using an imaging assembly, comprising a plurality of cameras, which are mounted in different, respective locations in the imaging assembly, with a scan accuracy that is limited by a predetermined mechanical position tolerance;
capturing respective images of the sample using the plurality of cameras while scanning the sample; and
processing the respective images captured by the plurality of cameras, the processing comprising recovering a virtual position clock responsively to a periodic pattern on the sample that appears in the respective images captured by at least one of the plurality of cameras and to relative movement between the sample and the imaging assembly while scanning the sample, using the virtual position clock in registering the respective images with one another; and
locating a position of a defect in the sample, relative to a point of reference on the sample, with respect to one or more features on the sample, thereby locating the defect with a position accuracy that is finer than the position tolerance.

15. The method according to claim 14, wherein each of the respective images contains a respective area of the sample, having a region of overlap with one or more neighboring images captured by the plurality of cameras in the imaging assembly, and wherein processing the respective images further comprises registering the respective images with one another using one or more features appearing in the region of overlap in order to compute a position of the defect.

16. The method according to claim 15, wherein the neighboring images have respective relative offsets that vary within the position tolerance of the motion assembly, and wherein registering the respective images comprises computing the respective relative offsets.

17. The method according to claim 16, wherein the respective images comprise pixels having a pitch, and wherein computing the respective relative offsets comprises determining the respective relative offsets with a precision that is finer than the pitch, and wherein processing the respective images comprises combining the respective images using the respective relative offsets to produce a combined image having a resolution finer than the pitch.

18. The method according to claim 15, wherein the respective images comprise pixels having pixel values and have a given signal/noise ratio (SNR), and wherein processing the respective images comprises summing the pixel values of the neighboring images in the region of overlap in order to produce a combined image having a greater SNR than the given SNR.

19. The method according to claim 14, and comprising illuminating the sample in at least first and second different illumination configurations during a scan of the sample by the imaging assembly, so that the respective images captured by the plurality of cameras comprise at least first and second sets of the respective images captured respectively in the first and second illumination configurations at different positions in the scan.

20. The method according to claim 14, wherein scanning the sample comprises moving the sample relative to the imaging assembly without gripping the sample.

21. The method according to claim 14, wherein the plurality of the cameras comprises at least twenty cameras.

22. The method according to claim 14, wherein the plurality of cameras in the imaging assembly are arranged in respective positions in at least one row along a direction transverse to a scan direction of the imaging assembly so that the respective images captured by each of the plurality of cameras while scanning the sample cover a respective swath of the sample along the scan direction, and so that the swaths together cover an entire active area of the sample in a single scan across the sample.

23. The method according to claim 22, wherein the at least one row comprises at least first and second rows, and wherein the respective positions of the plurality of cameras in the first row are staggered in the transverse direction relative to the positions of the plurality of cameras in the second row.

24. The method according to claim 14, wherein the sample is scanned by the imaging assembly in a scan direction, and wherein the method comprises shifting at least one post-inspection camera in a direction transverse to the scan direction while the imaging assembly scans the sample so as to position the at least one post-inspection camera over an area of the defect located by the image processor, and capturing an image of the area of the defect using the at least one post-inspection camera.

25. The method according to claim 24, wherein capturing the image comprises computing an error signal that is indicative of a deviation of movement of the imaging assembly relative to an ideal motion model, and driving the at least one post-inspection camera to image the area of the defect responsively to the error signal.

26. The apparatus according to claim 1, wherein the image processor is configured to determine a matching between overlapping images of the sample based on detection in the overlapping images of one or more features and/or one or more periodic patterns appearing in the overlapping images.

27. The method according to claim 14, wherein the processing the respective images comprises determining a matching between overlapping images of the sample based on detection in the overlapping images of one or more features and/or one or more periodic patterns appearing in the overlapping images.

28. An apparatus for inspection, comprising:
an imaging assembly, comprising a plurality of cameras, wherein each of the plurality of cameras is fixedly mounted in a different, respective location in the imaging assembly and is configured to capture a respective image of a sample during a scan;
a motion assembly, which is configured to move at least one of the imaging assembly and the sample so as to cause the imaging assembly to scan the sample with a scan accuracy that is limited by a predetermined mechanical position tolerance; and
an image processor, which is coupled to receive and process the respective images captured by the plurality of cameras during the scan, which estimates relative positions among the respective images by computing an estimated shift and an angular skew with respect to each of the plurality of cameras by recovering a virtual position clock responsively to a periodic pattern on the sample that appears in the respective images and to relative movement between the sample and the imaging assembly that is applied by the motion assembly; which uses the virtual position clock in registering the respective images with one another; which sums the relative positions to obtain a global position estimate; and which locates a defect in the sample, relative to a point of reference on the sample, with a position accuracy that is finer than the mechanical position tolerance.

* * * * *